United States Patent [19]

Holton et al.

[11] 4,143,696

[45] Mar. 13, 1979

[54] SELF-LOCKING, SELF-RETAINING FASTENER

[75] Inventors: Robert J. Holton, North Caldwell; James F. Waterson, Cranford, both of N.J.

[73] Assignee: Eaton Corp., Cleveland, Ohio

[21] Appl. No.: 822,487

[22] Filed: Aug. 8, 1977

[51] Int. Cl.² ................. H02G 3/14; F16B 37/02
[52] U.S. Cl. ..................... 151/41.75; 85/36; 174/53
[58] Field of Search .......... 151/41.75, 41.74, 20; 85/36, 32 V, 32 K; 220/3.2, 3.8; 174/53, 58

[56] References Cited

U.S. PATENT DOCUMENTS

| 2,208,548 | 7/1940 | Murphy | 85/36 |
|---|---|---|---|
| 3,088,560 | 5/1963 | Preuss | 151/41.75 X |
| 3,783,922 | 1/1974 | Petrus | 151/41.74 |
| 3,895,732 | 7/1975 | Robinson et al. | 85/36 X |
| 3,910,156 | 10/1975 | Soltysik | 85/36 X |
| 3,952,475 | 4/1976 | Paskert | 151/41.75 X |
| 4,036,389 | 7/1977 | Pate et al. | 151/41.75 X |
| 4,069,448 | 1/1978 | Gernhardt | 151/41.75 X |
| 4,071,159 | 1/1978 | Robinson et al. | 85/36 X |

FOREIGN PATENT DOCUMENTS 51264  2/1942  France ................. 85/36

*Primary Examiner*—Rodney H. Bonck
*Attorney, Agent, or Firm*—Howard D. Gordon

[57] ABSTRACT

An improved self-retaining fastener which allows non-rotational, longitudinal insertion of an externally threaded fastener and prevents non-rotational, longitudinal removal thereof. The improved fastener includes antirotation means adapted for frontal insertion into a mounting structure, means for self-locking upon insertion into the mounting structure, and means for enhancing the locking frictional force imposed on the externally threaded fastener.

2 Claims, 5 Drawing Figures

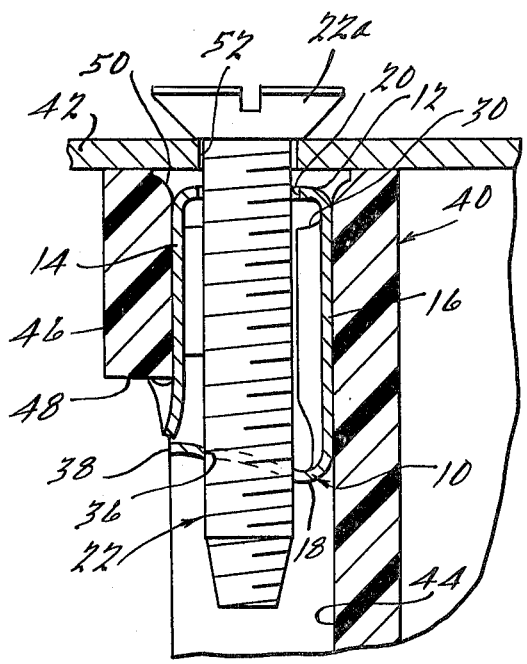
Fig. 1.
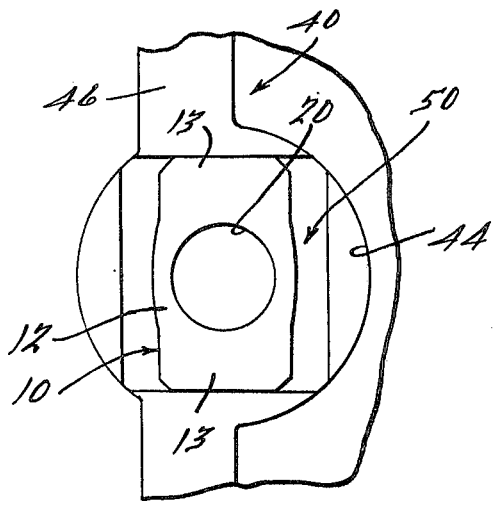
Fig. 2.
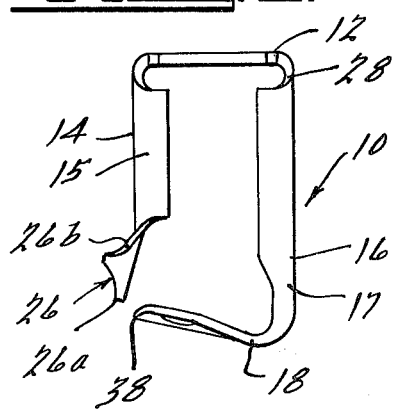
Fig. 3.
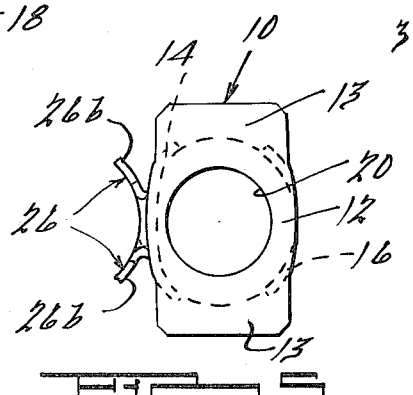
Fig. 4.
Fig. 5.

SELF-LOCKING, SELF-RETAINING FASTENER

BACKGROUND OF THE INVENTION

1. Field of the Invention

This invention relates generally to fasteners for receiving externally threaded members and more particularly to self-retaining fasteners for receiving and longitudinally retaining non-rotationally inserted externally threaded fasteners.

2. Description of the Prior Art

Self-retaining fasteners for receiving and longitudinally retaining non-rotationally inserted externally threaded fasteners are known in the prior art. Among the best examples of the prior art devices is that disclosed in U.S. Pat. No. 3,952,475 of Joseph H. Paskert, which is assigned to the assignee of the present invention. All other prior art devices have demonstrated certain disadvantages in that they have been complicated and expensive to manufacture and have had relatively low resistance to longitudinal removal of fasteners.

Further, no prior art fastener, including the cited fastener, has provided for longitudinal and rotational retention upon frontal insertion into a mounting structure as is highly desirable in repetitive assembly operations such as are encountered in the manufacture of such articles as electrical junction boxes.

SUMMARY OF THE INVENTION

Responsive to the cited disadvantages in the prior art fasteners it is an object of the present invention to provide a simple inexpensively producible, self-retaining fastener which provides for non-rotational, longitudinal insertion of an externally threaded fastener and prevents non-rotational, longitudinal removal thereof.

It is another object to provide a fastener having an improved resistance to longitudinal mating fastener removal over prior art devices.

It is a further object to provide a fastener configured to permit rotational and longitudinal self-retention upon frontal insertion into a mounting surface.

BRIEF DESCRIPTION OF THE DRAWINGS

These and other objects and features will become apparent to those skilled in the fastener art upon reading the following detailed description with reference to the accompanying drawings in which:

FIG. 1 is a partial cross sectional view showing the invention fastener installed in a mounting structure and receiving an externally threaded fastener;

FIG. 2 is a top elevational view of the invention fastener installed in a mounting structure;

FIG. 3 is a front elevational view of the invention fastener;

FIG. 4 is a side elevational view of the invention fastener;

FIG. 5 is a top elevational view of the invention fastener.

DESCRIPTION OF THE PREFERRED EMBODIMENT

Referring now to the drawings and in particular first to FIG. 2, an improved fastener 10 is illustrated as being formed as a unitary generally cylindrically shaped structure which is preferably formed of a resilient material such as spring sheet metal as through stamping and related processes.

It should be noted that as the description progresses, any reference to location as top, bottom, or left and right side shall be oriented as illustrated in FIG. 1.

The improved fastener 10 is illustrated as including a top fastener receiving portion 12, a side, longitudinal retaining portion 14, a side, guiding portion 16, and a bottom threaded fastener retaining portion 18.

The fastener receiving portion 12 is a flat generally rectangular shape, as may best be seen in FIGS. 2 and 5, and includes a centrally located through aperture, such as the clearance hole 20, sized to loosely receive an externally threaded fastener shown as a screw 22 in FIG. 1.

The longitudinal retaining portion 14 extends downward from the fastener receiving portion 12 parallel to the axis of the clearance hole 20. It should be noted that the entire fastener 10 is preferably formed first as a substantially flat stamping in which all portions 12, 14, 16 and 18 lie substantially in the same plane the various portions being subsequently bent to the configuration shown in the drawings. Radii formed during the initial stamping adjacent the intersection of the various fastener portions facilitate the subsequent bending to the final shape. Also during the stamping operation the outer surface 15 of longitudinal retaining portion 14 is formed to define a semi-circular surface about the axis of the clearance hole 20 and a radially outwardly extending barb portion 26 is formed at the lower end of the longitudinal retaining portion 14.

Guide portion 16 extends downward from the fastener receiving portion 12 and is formed in a manner similar to the longitudinal retaining portion 14, including bend enabling radii and defining a semi-circular outer surface 17. It further includes blend radii proximate its lower end where a bending intersection with the fastener retaining portion 18 occurs.

Fastener retaining portion 18 is formed as a generally flat plate, canted upward to define an acute angle of about 30°–50° with the longitudinal axis of the clearance hole and fastener and includes a screw receiving aperture 36. The free end 38 is bent downward approximately 6° (degrees) at the plane 32 bisecting the hole 36.

INSTALLATION AND USE OF THE INVENTION FASTENER

Referring now to FIGS. 1 and 2, the invention fastener 10 is illustrated in an electrical connection box 40 for retaining, a cover plate 42. The fastener 10 is installed by insertion into an aperture such as a bore 44 formed through a flange 46 formed on the box 40. A tapered leading edge 26a on the barb portion 26 facilitates insertion into bore 44, and the retaining portion 14 resiliently deforms inward until the barb's trailing edge 26b clears the lower surface 48 of flange 46. The barb portion 26 then snaps outward to the position shown in FIG. 1 preventing longitudinal upward movement of the fastener 10 unless the barb portion 26 is pushed inwardly. The fastener receiving portion 12 is formed with shoulders 13 to seat within a portion of a locking socket 50 formed in the flange 46. The shoulders 13 prevent rotation of the fastener 10 when they are in the position shown in FIG. 2.

When the fastener 10 is so positioned, the screw 22 is inserted longitudinally through a clearance hole 52 in plate 42 and through the clearance hole 20 in the fastener 10. As the screw 22 reaches the retaining portion 18, it engages the left (as viewed in FIG. 1) side of the hole 36 proximate the screw major diameter and the retaining portion 18 is rotated counter-clockwise to permit passage of the screw 22 through the hole 36. As the major diameter thread peak passes through the hole 36, the retaining portion 18 snaps back and further longitudinal insertion effects a ratcheting movement between the screw 22 and retaining portion 18.

Upon completing insertion of the screw 22 to a position wherein its head 22a is adjacent the plate 22, the screw 22 is rotated in the conventional manner as its threads engage opposed edges of the retaining portion 18 which becomes oriented to coincide with the helix angle of the screw threads thereby enhancing frictional engagement between the screw and fastener. Continued rotation of the screw 22 draws the free end 38 of retaining portion 18 into engagement with the barb portion 26 permitting the generation of relatively high axial locking forces on the screw threads. The invention fastener 10, then is seen to provide self locking of a longitudinally inserted externally threaded fastener which is subsequently rotated.

While one embodiment of the invention fastener 10 has been described, various modifications and alterations will become apparent to those skilled in the art without departing from the scope and spirit of this invention.

What is claimed is:

1. A self-locking, self-retaining fastener adapted for frontal insertion into a bore in a base for receiving and retaining a longitudinally non-rotationally inserted screw which resists non-rotational removal of the screw after insertion and lockingly engages the inserted screw upon rotation of the screw, said fastener having a resilient one piece body including a fastener receiving portion having a fastener receiving aperture therethrough, a longitudinal retaining portion attached to one side of said fastener receiving portion and extending parallel to the longitudinal axis of said fastener, a guiding portion attached to said fastener receiving portion opposite said longitudinal retaining portion and extending parallel to the longitudinal axis of said fastener, said longitudinal retaining portion, fastener receiving portion and guiding portion defining a generally U-shaped cross-section on a plane passing through said retaining portion, guiding portion and longitudinal axis, and a cantilevered bottom fastener retaining portion attached to the end of said guiding portion opposite said fastener receiving portion, said bottom fastener retaining portion lying in a plane which intersects the longitudinal axis at an acute angle and having therein a fastener engaging aperture substantially aligned with said longitudinal axis, said fastener engaging aperture having opposed edges which will engage and retain the major diameter of the threads of said screw, said longitudinal retaining portion having at least one projection near the free end thereof, said projection extending away from the longitudinal axis of said fastener and being adapted to engage a portion of said base when said fastener is inserted into said base, rotational tightening of a received screw effective to cause the free end of said bottom fastener retaining portion to engage the free end of said longitudinal retaining portion to resist movement of said projection towards said longitudinal axis thereby locking said fastener in said base and preventing further movement of the bottom fastener retaining portion relative to said longitudinal retaining portion thereby allowing a significant friction engagement to be developed between the received fastener and the fastener engaging aperture.

2. A fastener according to claim 1 wherein said acute angle is about 30–50 degrees.

* * * * *